US007744464B2

(12) United States Patent
Shuster

(10) Patent No.: US 7,744,464 B2
(45) Date of Patent: Jun. 29, 2010

(54) METHOD OF MANAGING A CARD GAME, A COMPUTER IMPLEMENTATION THEREOF, AND A CARD GAME KIT

(76) Inventor: Gary Stephen Shuster, P.O. Box 11289, Zephr Cove, NV (US) 89448

( * ) Notice: Subject to any disclaimer, the term of this patent is extended or adjusted under 35 U.S.C. 154(b) by 714 days.

(21) Appl. No.: 11/533,236

(22) Filed: Sep. 19, 2006

(65) Prior Publication Data

US 2008/0070664 A1 Mar. 20, 2008

(51) Int. Cl.
*A63F 13/00* (2006.01)

(52) U.S. Cl. .............................. 463/31; 463/11; 463/16

(58) Field of Classification Search ............. 463/11–13, 463/16, 31; 273/292, 274, 309, 244.2, 149 R, 273/149 P See application file for complete search history.

(56) References Cited

U.S. PATENT DOCUMENTS 4,926,327 A * 5/1990 Sidley ......................... 463/13
5,382,025 A * 1/1995 Sklansky et al. ............ 273/292
5,713,574 A * 2/1998 Hughes ....................... 273/292
6,065,753 A * 5/2000 Morosky ..................... 273/292
6,585,267 B2 * 7/2003 Webb ......................... 273/274
6,637,746 B1 * 10/2003 Baranauskas ............... 273/292
6,638,161 B2 * 10/2003 Soltys et al. .................. 463/12
7,296,799 B1 * 11/2007 Baker ......................... 273/292
2006/0068870 A1 * 3/2006 Crawford et al. .............. 463/13

OTHER PUBLICATIONS

"Duplicate Poker Rules", Aug. 2, 2007 , http://www.duplicatepoker.com/WebSite/epokerusa.aspx?page=dpg_rules, pp. 1-9.

* cited by examiner

*Primary Examiner*—James S McClellan
(74) *Attorney, Agent, or Firm*—Connolly Bove Lodge & Hutz LLP; Jonathan A. Jaech

(57) ABSTRACT

A method of managing a card game, a computer implementation thereof, and a card game kit are disclosed. In the method, a plurality of cards are dealt in one or more rounds to a plurality of players, each player receiving one or more cards in each round, with each card bearing a designated value and suit. The values and suits of the cards dealt are recorded in each round. Those values and suits are then revealed to the players during one or more of the rounds to enable the players to wager or withdraw from the game.

20 Claims, 1 Drawing Sheet

Fig. 1
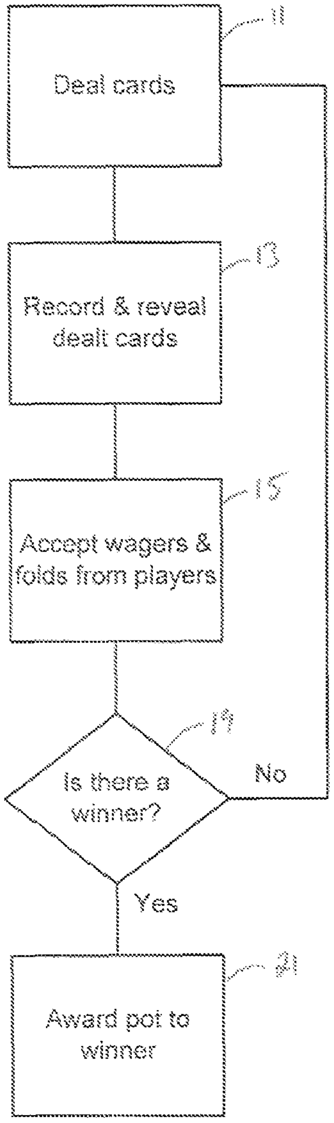
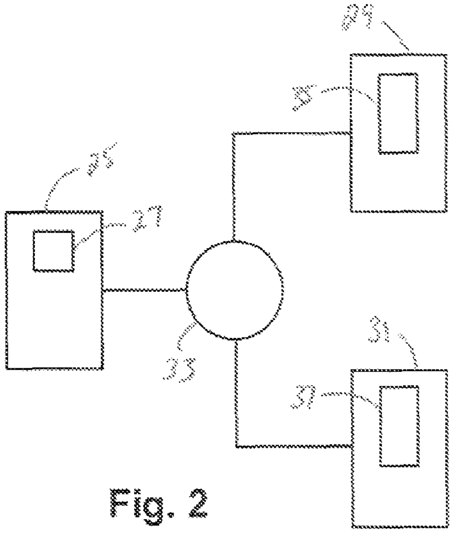
Fig. 2
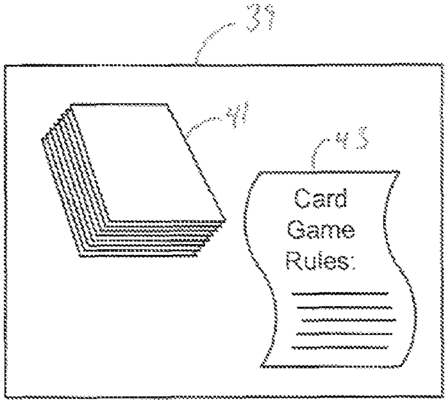
Fig. 3

METHOD OF MANAGING A CARD GAME, A COMPUTER IMPLEMENTATION THEREOF, AND A CARD GAME KIT

BACKGROUND OF THE INVENTION

1. Field of the Invention

The field of the present invention is card games.

2. Background

Numerous card games are known in the art, many of which are played with multiple players in competition against one another. In these various games, one or more decks of playing cards are shuffled and dealt to the players. Each player plays using the cards that are randomly dealt to each respective player. The outcome of such games is not determined by luck alone, but also involves an element of skill on the part of the players. For example, card games such as bridge, poker, pinochle, and other such games are generally recognized as involving both luck and skill in competitive game play. While some of these games have been around for many years in their current form, new games, and even new variations on old games, are always needed as players' skills and tastes change over time.

SUMMARY OF THE INVENTION

The present invention is directed toward a method of managing a card game, a computer implementation thereof, and a card game kit. In the method, a plurality of cards, each bearing a designated value and suit, are dealt in one or more rounds to a plurality of players, with each player receiving one or more cards in each round. The values and suits of the cards dealt in each round is recorded. The recorded values and suits are revealed to the players during one or more of the rounds so that the players may either wager or withdraw from the game. Preferably, when the values and suits of the cards are revealed, they are revealed in a manner which is not indicative of the cards dealt to each player.

In the computer-implemented method, an electronic card game interface is served to a plurality of players. The interface may be served to at least one of the players using a network. In one or more rounds of play, a plurality of simulated cards from a simulated deck of cards are allocated to the players within a computer memory. Each player receives one or more of the simulated cards in each round, and each simulated card is assigned a designated value and suit. During one or more of the rounds, the values and suits assigned to the allocated simulated cards is revealed to the players so that the players may either wager or withdraw from the game.

The card game kit comprises a plurality of playing cards, each bearing a designated value and suit, and instructions which include rules to a card game. The rules describe playing the card game as a series of steps. Initially, a first round of cards is dealt, with each player receiving one or more cards. The values and suits of the cards dealt in the first round are recorded. The recorded values and suits are revealed to the players so that the players may either wager or withdraw from the game. One or more subsequent rounds are dealt, with each non-withdrawing player receiving one or more cards in each subsequent round. The values and suits of the cards dealt in each subsequent round is recorded and revealed to the players so that the non-withdrawing players may either wager or withdraw from the game during each subsequent round. Game play continues until one of the players is determined to be the winner.

Accordingly, an improved method of managing a card game, a computer implementation thereof, and a card game kit are disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1 is a flowchart illustrating a process for managing a card game;

FIG. 2 schematically illustrates a computer network over which a card game may be played; and FIG. 3 illustrates a card game kit.

DETAILED DESCRIPTION OF THE PREFERRED EMBODIMENTS

Turning in detail to the drawings, FIG. 1 is a flowchart showing a process for managing a card game. Initially, one or more cards are dealt 11 to each player in a first round of the game. The cards may be of any type, but for simplicity, the remainder of the description below refers to a standard deck of playing cards of the type commonly used in the various incarnations of poker. The number of cards dealt to each player in the first round may vary from one to many, with the number generally depending upon other game rules agreed to by the players. For example, the players may agree to play the card game in a manner similar to one of the poker games "5 Card Stud" or "Texas Hold 'Em", in which case each player is dealt two cards in the first round. The remainder of the game may be played in a manner substantially similar to either of the aforementioned card games, but including the additional recordation and revelation 13 of dealt cards as described below.

After the first round of cards have been dealt 11, the dealer records and reveals 13 the values and suits of all cards dealt in the first round to each player. The cards are preferably revealed to the players in an order that is not indicative of the cards held by each player. For example, the dealt cards may be revealed in order of value, in order of suit, or in any other order which is not related to the order in which the cards were dealt. The players are then permitted to place a wager in the round or fold 15 and withdraw from the game. Alternatively, in any round, the values and suits of the cards dealt may be revealed to the players after the players decide to place a wager or withdraw. Where the card game proceeds in a manner similar to a poker game, the wagering and folding options for players may also proceed according to the rules of the particular poker game. Alternatively, the players may set their own rules for wagering and folding during any particular round.

Following wagering in the first round, if one of the players is determined to be the winner 19, then the accumulated wagers are awarded 21 to the winner. If there is no winner after the first round, game play proceeds to successive rounds which are played in a manner similar to game play in the first round, until one of the players wins and is awarded the accumulated wagers.

Several variations are possible during game play. For example, the values and suits of the cards dealt need not be revealed following dealing in the first round, but instead may be revealed during any one or more of the subsequent rounds.

The method of managing a card game described above may be implemented using a single computer, or using multiple computers connected over a local area network or a wide area network. The single computer configuration is best suited for use by a single human player who plays against one or more computer-generated player representations, i.e., simulated players, although a single computer, multi-human player configuration is possible. FIG. 2 shows a multiple computer configuration which includes a host computer 25 which runs processes using a memory 27 for the simulated game. The players interact with the host computer 25 through other computers 29, 31 connected to the host computer 25 over a network 33. Each of the player computers 29, 31 includes a player interface 35, 37 for displaying the card game to each respective human player. Optionally, the host computer may also include a player interface for used by one of the players. Each of the networked computers includes an input device (not shown), e.g., keyboard, mouse, touch-screen display, and the like, which allows the player to interact with the processes of the simulated game.

In the computer implemented card game, the simulated game processes allocate simulated cards from a simulated deck to each of the players according to the rules of the card game as discussed above in connection with FIG. 1. The simulated deck is preferably a representation of a standard deck of playing cards for poker, although any suitable simulated deck of cards may be used. Through each successive round of the simulated card game, the players interact with the simulated game processes to place wagers or withdraw from the game as desired, until one of the players wins and is awarded the accumulated wagers.

FIG. 3 shows a card game kit 39 which includes a deck of cards 41 and instructions 43. The deck of cards 41 is preferably a standard deck of playing cards for poker, although any suitable deck of cards may be used. The instructions 43 provide the rules of game play as discussed above in connection with FIG. 1.

Thus, a method of managing a card game, a computer implementation thereof, and a card game kit are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A computer-implemented method for playing a card game, the method comprising:

serving an electronic card game interface to a plurality of players;

allocating, in one or more rounds, a plurality of simulated cards from a simulated deck of cards to the plurality of players in a computer memory, wherein each player receives one or more of the simulated cards in each round, and each simulated card is assigned a designated value and suit; and revealing to the players, during one or more of the rounds, the values and suits assigned to all of the allocated simulated cards, in order of the values assigned to each of the allocated simulated cards, said order being not indicative of which cards are allocated to each player, to enable the players to do one of wager or withdraw from the game during each round.

2. The method of claim 1, wherein serving the electronic card game interface to the plurality of players includes serving the interface to at least one player over a network, the computer memory being operatively connected to the network.

3. The method of claim 1, wherein revealing the values and suits assigned to the allocated simulated cards includes revealing the assigned values and suits also in order of suit of each simulated card.

4. The method of claim 1, wherein revealing the values and suits assigned to the allocated simulated cards includes revealing the assigned values and suits during each round.

5. The method of claim 1, wherein revealing the values and suits assigned to the allocated simulated cards includes revealing the assigned values and suits before the players do one of wager or withdraw from the game.

6. The method of claim 1, wherein revealing the values and suits assigned to the allocated simulated cards includes revealing the assigned values and suits on a computer display.

7. The method of claim 1, wherein at least one of the players comprises a computer-generated player representation.

8. A computer-implemented method for playing a card game, the method comprising:

serving an electronic card game interface to a plurality of players;

allocating, in one or more rounds, a plurality of simulated cards from a simulated deck of cards to the plurality of players in a computer memory, wherein each player receives one or more of the simulated cards in each round, and each simulated card is assigned a designated value and suit; and revealing to the players, during one or more of the rounds, the values and suits assigned to all of the simulated cards allocated to the players, in order of the suits assigned to the allocated simulated cards, said order being not indicative of which cards are allocated to each player, to enable the players to do one of wager or withdraw from the game during each round.

9. The method of claim 8, wherein serving the electronic card game interface to the plurality of players includes sewing the interface to at least one player over a network, the computer memory being operatively connected to the network.

10. The method of claim 8, wherein revealing the values and suits assigned to the allocated simulated cards includes revealing the assigned values and suits also in order of value of each simulated card.

11. The method of claim 8, wherein revealing the values and suits assigned to the allocated simulated cards includes revealing the assigned values and suits during each round.

12. The method of claim 8, wherein revealing the values and suits assigned to the allocated simulated cards includes revealing the assigned values and suits before the players do one of wager or withdraw from the game.

13. The method of claim 8, wherein revealing the values and suits assigned to the allocated simulated cards includes revealing the assigned values and suits on a computer display.

14. The method of claim 8, wherein at least one of the players comprises a computer-generated player representation.

15. A computer-implemented method for playing a card game, the method comprising:

in a game involving at least two players, serving an electronic card game interface from a server to at least one client assigned to a player;

allocating, in one or more rounds, a plurality of simulated cards from a simulated deck of cards to player hands in a computer memory, wherein each of the player hands is allocated one or more of the simulated cards in each round, and each simulated card has a definite value and suit; and providing, during one or more of the rounds, the values and suits assigned to all of the allocated simulated cards to the at least one client for revealing to the player in an order that is not related to any order in which the simulated cards are allocated to the player hands during the one or more of the rounds and that is not indicative of which cards are allocated to each of the player hands, to enable the at least two players to do one of wager or withdraw from the game after the values and suits assigned to all of the allocated simulated cards are revealed.

16. The method of claim 15, wherein revealing the values and suits assigned to the allocated simulated cards comprises revealing the assigned values and suits in order of value of each simulated card.

17. The method of claim 15, wherein revealing the values and suits assigned to the allocated simulated cards comprises revealing the assigned values and suits in order of suit of each simulated card.

18. The method of claim 15, wherein revealing the values and suits assigned to the allocated simulated cards includes revealing the assigned values and suits during each round.

19. The method of claim 15, wherein revealing the values and suits assigned to the allocated simulated cards includes revealing the assigned values and suits before any of the at least two players do one of wager or withdraw from the game.

20. The method of claim 15, wherein at least one of the at least two players comprises a computer-generated player representation.

* * * * *

UNITED STATES PATENT AND TRADEMARK OFFICE

CERTIFICATE OF CORRECTION

PATENT NO. : 7,744,464 B2
APPLICATION NO. : 11/533236
DATED : June 29, 2010
INVENTOR(S) : Gary S. Shuster It is certified that error appears in the above-identified patent and that said Letters Patent is hereby corrected as shown below:

Col. 4 Claim 9, line 32, delete “sewing” and insert -- serving --

Signed and Sealed this

Twenty-fourth Day of August, 2010

David J. Kappos
*Director of the United States Patent and Trademark Office*